United States Patent [19]

Chapman

[11] 4,230,153

[45] Oct. 28, 1980

[54] BACK PRESSURE SYSTEM FOR SLURRY PIPELINE

[75] Inventor: Jay P. Chapman, Nampa, Id.

[73] Assignee: Bechtel International Corporation, San Francisco, Calif.

[21] Appl. No.: 849,061

[22] Filed: Nov. 7, 1977

[51] Int. Cl.[3] .......... F16K 11/22

[52] U.S. Cl. .......... 137/599

[58] Field of Search .......... 137/599, 599.1

[56] References Cited

PUBLICATIONS

Cobb, Jr., et al., Application Ser. No. 692,145, laid open to public inspection on Dec. 24, 1968, as noted at 857 O.G. 1039.

*Primary Examiner*—Robert G. Nilson

*Attorney, Agent, or Firm*—John L. McGannon

[57] ABSTRACT

For use in providing back pressure in a slurry flow, a first pipe has an inlet for receiving the slurry and an outlet for discharging the slurry. A number of inverted U-shaped second pipes communicate at their ends with the first pipe at respective, spaced locations along the length of the first pipe. Each second pipe has a pair of spaced sides and each side has an orifice choke therewithin. The sides of each second pipe extend upwardly from the first pipe so that the second pipes are self-draining. A valve is provided for each second pipe, respectively, each valve being carried by the first pipe near one end of the corresponding second pipe. A generally horizontal third pipe is coupled to the first pipe in bypass relationship thereto. Valve means controls the flow of a slurry into either the first or the third pipe.

10 Claims, 4 Drawing Figures

BACK PRESSURE SYSTEM FOR SLURRY PIPELINE

This invention relates to improvements in the control of slurries as they flow from one location to another and, more particularly, to a system for providing back pressure in a slurry flow to minimize deterioration of the pipeline through which the slurry flows.

BACKGROUND OF THE INVENTION

In a slurry pipeline it is often necessary to provide back pressure to avoid damage to the pipeline. This back pressure is usually provided by one or more orifice chokes located to limit the volume rate of flow of the slurry at the outlet of the pipeline. If the back pressure must be varied, the system requires more than one orifice choke.

In a conventional slurry pipeline system, the orifice chokes are placed in bypass pipes connected to a main or central pipe with the bypass pipes being in a horizontal plane. By controlling a number of valves near the bypass pipes, the slurry flow can be directed through one or more of the bypass pipes to vary the back pressure. The bypass pipes are used because, under certain hydraulic circumstances, the main pipe pressure upstream of the bypass pipes falls below the vapor pressure of water which causes the fluid to cavitate and flow at a higher velocity while only partially filling the main pipe. This high velocity and cavitation erodes the pipe at an undesirable rate. To prevent this, the slurry flow is shunted into one or more of the bypass pipes, each of which contains a choke to increase the back pressure in the pipe.

Because the bypass pipes are in horizontal planes, they cannot adequately drain so that solids are collected in them and totally or partially plug the bypass pipes. This requires the system to be cleaned out frequently to assure continuous operation. Moreover, the arrangement of bypass pipes in horizontal planes requires a relatively large number of valves; specifically, at least three valves for each bypass pipe, respectively. For achieving a wide range of back pressures, a relatively large number of control valves are necessary, thereby increasing the cost and complexity of the conventional back pressure systems. A need has, therefore, arisen for an improved system for providing back pressure in a slurry flow in a simple manner while avoiding the problem of plugging as occurs in conventional systems.

SUMMARY OF THE INVENTION

The present invention substantially satisfies the aforesaid need by providing an improved back pressure system for a slurry pipeline, wherein the system includes a first pipe having a number of second, inverted U-shaped pipes at spaced locations along the length of the first pipe with each second pipe having orifice choke means therewithin to provide an incremental back pressure in the slurry flow therethrough. Flow into each second pipe is controlled by a single valve rather than three valves as required in conventional systems. Moreover, the fact that the second pipes are vertically disposed permits them to be self-draining so that solids cannot collect in them which would otherwise substantially plug them when they are not in use. The fact that the second pipes extend upwardly from the first pipe assures that solids will gravitate into the main slurry flow and will not otherwise cause plugging of any part of the system to assure substantially continuous flow therethrough. The system of the present invention also provides bypass means to permit fluid flow therethrough to allow maintenance work on the orifice chokes and valves, if necessary.

The primary object of this invention is to provide a slurry flow system having improved back pressure means which minimizes the number of control valves to achieve a variable back pressure yet the system is self-draining and cannot be substantially plugged by accumulation of solids as in a conventional system.

Another object of this invention is to provide a system of the type described, wherein the system includes a main or first pipe having a plurality of vertically disposed inverted U-shaped second pipes communicating therewith at spaced locations along the length of the first pipe with each second pipe having orifice choke means therewithin, and a single valve for controlling the communication between each second pipe and the first pipe so that the cost of the system is reduced with reference to the cost of a conventional back pressure unit and the system is self-draining to substantially eliminate plugging of the second pipes to thereby permit substantially continuous operation of the system notwithstanding the possibility of high concentrations of solids in the slurry flows therethrough.

Other objects of this invention will become apparent as the following specification progresses, reference being had to the accompanying drawings for an illustration of a prior art system and a system of the present invention.

Figure 1:
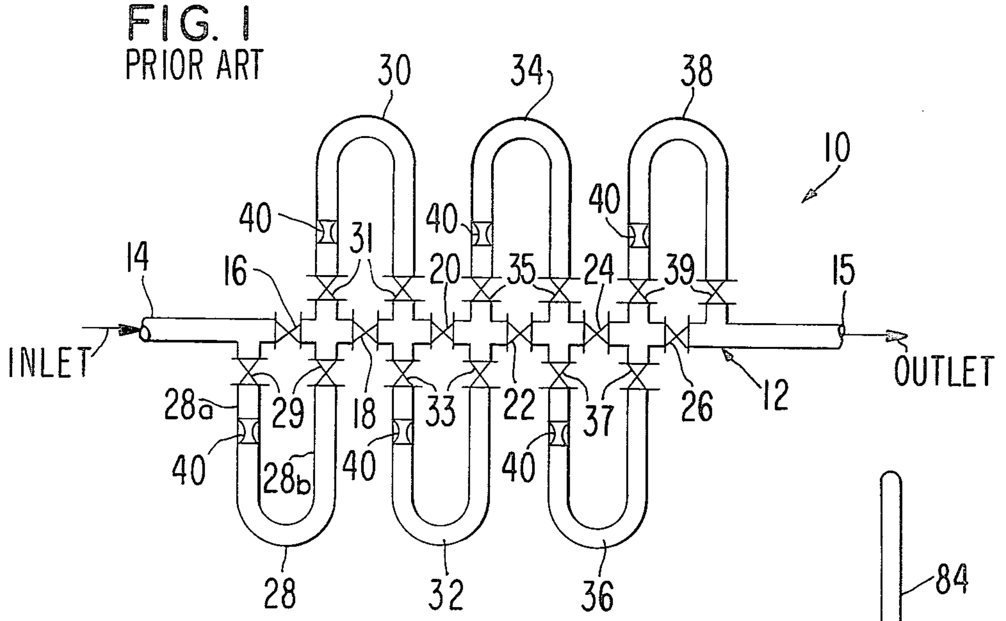
FIG. 1 PRIOR ART
FIG. 1 is a top plan view, partly schematic, of a back pressure device of the prior art.
Figure 4:
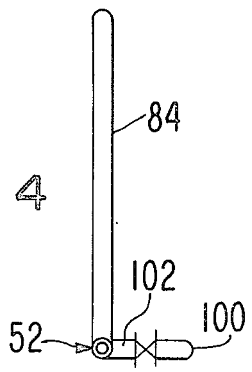
FIG. 4 is an end elevational view of the device of FIG. 2.

A typical prior art device for providing back pressure in a slurry pipeline is shown in FIG. 1 and broadly denoted by the numeral 10. Device 10 typically includes a horizontal first pipe 12 having an inlet end 14 and an outlet end 15. Inlet end 14 is adapted to be coupled to a source of a slurry and the outlet end is adapted to be coupled to a receiver for the slurry. Pipe 12 has a series of valves 16, 18, 20, 22, 24 and 26 at spaced locations along its length. The pipe also has a number of U-shaped second pipes 28, 30, 32, 34, 36 and 38 on respective sides of pipe 12. Each of these pipes 28–38 is horizontally disposed and has an orifice choke 40 in one of the sides thereof. These orifice chokes provide back pressure in the corresponding second pipes depending upon the closure of certain valves.

Each second pipe has a pair of valves in respective, parallel sides thereof to keep the flow out of such pipe. For instance, second pipe 28 has a pair of spaced sides *28a* and *28b* provided with valves 29. Similarly, second pipe 30 has a pair of valves 31, second pipe 32 has a pair of valves 33, second pipe 34 has a pair of valves 35, second pipe 36 has a pair of valves 37 and second pipe 38 has a pair of valves 39.

When it is desired to provide no back pressure, valves 16, 18, 20, 22, 24 and 26 are open and valves 29, 31, 33, 35, 37 and 39 are closed. Thus, the slurry flow path is directly through pipe 12 from inlet 14 to outlet 15. When it is desired to have a relatively small back pressure, such as 50 psi, valve 16 is closed, valves 18, 20, 22, 24, 26 and 29 are open, and valves 31, 33, 35, 37 and 39 are closed. Then, the flow is into pipe 12 through inlet 14, then through second pipe 28 in bypassing relationship to valve 16 and then back into first pipe 12 for flow through the remaining length of the latter to outlet 15.

For an intermediate back pressure, such as 100 psi, valves 20, 22, 24 and 26 and valves 29 and 31 are open and valves 16 and 18 and valves 33, 35, 37 and 39 are closed. In such a case, the slurry flow is into first pipe 12, through second pipes 28 and 30, and then back into the first pipe 12 for flow to outlet 15. In this case, two orifice chokes 40, those in second pipes 28 and 30, will operate to provide the back pressure for the slurry flow.

For a maximum back pressure in the system, such as 300 psi, valves 16, 18, 20, 22, 24 and 26 are closed and valves 29, 31, 33, 35, 37 and 39 are open. Thus, the slurry flow is into first pipe 12 at inlet 14, then through second pipes 28, 30, 32, 34, 36 and 38 in bypass relationship to first pipe 12. The slurry then re-enters the first pipe near inlet 15 and flows through the latter to the receiver.

It can be seen that three valves are needed per orifice 40 to obtain the flexibility of using each orifice choke individually. Valves 29, 31, 33, 35, 37 and 39 are needed to prevent plugging of the corresponding second pipes and each side of each second pipe requires a valve for this purpose.

Figure 2:
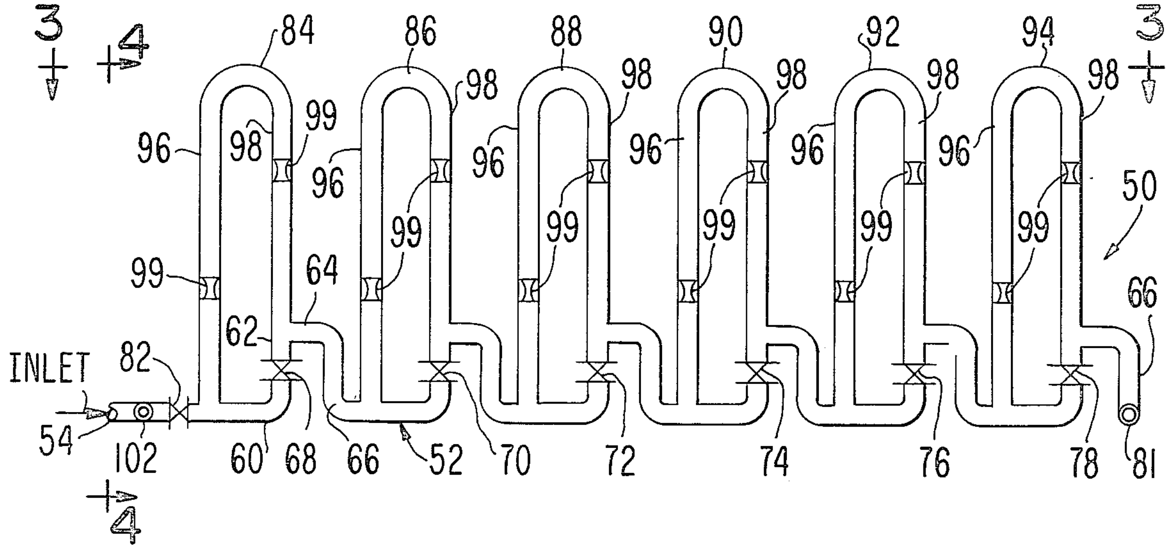
FIG. 2 is a side elevational view of a back pressure device of the present invention.

To avoid the need for so many valves in a variable back pressure system, the present invention, shown in FIG. 2, has been provided, the system being defined by the numeral 50 and including a first pipe 52 having an inlet 54 and an outlet 56. Outlet 56 is spaced below the level of inlet 54.

First pipe 52 has undulations at spaced locations along its length. At each such location, pipe 52 has a first pipe segment provided with a horizontal part 60 and a vertical part 62. Also at each location, pipe 52 has a second pipe segment provided with a horizontal part 64 and a vertical part 66. The upper end of each vertical part 62 communicates with the corresponding open end of the adjacent horizontal part 64 of the next adjacent second segment. The lower end of each vertical part 66 communicates with the corresponding open end of the horizontal part 60 of the next adjacent first segment. The vertical part 62 of the various first segments include respective valves 68, 70, 72, 74, 76 and 78. The vertical part 66 of the last or downstream second segment is connected to a horizontal part 81 (FIG. 3) which has a valve 80 near outlet 56. Similarly, horizontal part 60 of the upstream first segment has a valve 82 near inlet 54.

For each pair of first and second segments of pipe 52, there is associated an inverted U-shaped second pipe provided with back pressure means therewithin. Thus, system 50 includes second pipes 84, 86, 88, 90, 92 and 94. Each second pipe is in a vertical plane or otherwise extends up and down for self-draining purposes. Typically, the second pipes are in the same vertical plane. Each second pipe has a pair of spaced, generally parallel sides 96 and 98 and each of the sides has an orifice choke 99 therewithin. Typically, two chokes 99 are used in each second pipe to distribute orifice choke pressure loss and thus potentially reduce levels and distributor wear when the bypass valve is closed, any one of valves 68, 70, 72, 74, 76 and 78. Side 96 is longer than side 98; thus, the lower open end of side 96 communicates with the horizontal part 60 of the corresponding first segment and the lower open end of each side 98 communicates with the function of the vertical part 62 of the corresponding first segment and the horizontal part 64 of the corresponding second segment.

Figure 3:
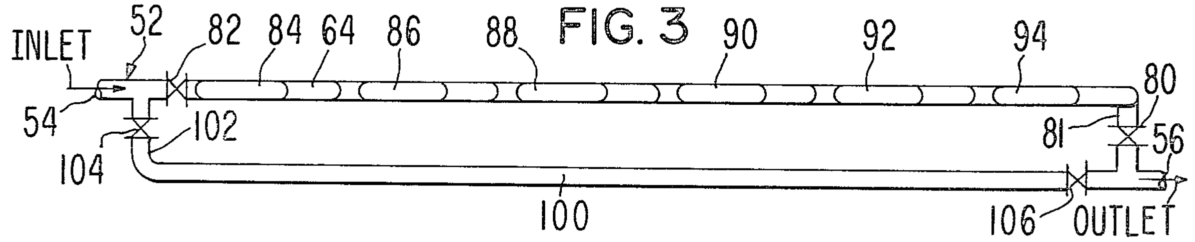
FIG. 3 is a top plan view of the device of FIG. 2.

A third pipe 100 is disposed in bypass relationship to the first and second pipes. To this end, pipe 100 is generally horizontal and is in the same horizontal plane as first pipe 52 as shown in FIGS. 2 and 3. Pipe 100 has an upstream horizontal part 102 which is perpendicular to pipe 52 and communicates with pipe 52 near inlet 54. A valve 104 in horizontal part 102 controls fluid flow thereinto. The downstream end of pipe 100 is connected to and communicates with horizontal part 81 and has a valve 106 to control slurry flow therethrough.

A typical operation of system 50 provides that each pair of orifice chokes 99, i.e., the pair in each second pipe, will provide a certain back pressure, such as 50 psi. Assuming no back pressure is desired, valves 104 and 106 are closed and valves 68 and 78 and valves 80 and 82 are opened. The slurry flow path is then directed through first pipe 52 including flow through the various first and second segments. There will be no flow through any of the second pipes 84–94. Alternately, there can be flow through third pipe 100 if no back pressure is desired. In such a case, valves 80 and 82 are closed and valves 104 and 106 are opened.

When it is desired to provide a low back pressure, such as 50 psi, valves 80 and 82 are opened and valves 68, 104 and 106 are closed. In this case, the fluid flow will enter inlet 54, flow into second pipe 84 through sides 96 and 98 thereof, and then into pipe 52 at the horizontal part 64 of the second segment corresponding to valve 68. Then the flow will continue in the first pipe 52 and bypass the remaining second pipes 86–94, as valves 70 through 78 are also open, until the flow reaches outlet 56.

For an intermediate back pressure, such as 100 psi, valves 72, 74, 76, 78, 80 and 82 are opened. Valves 68, 70, 104 and 106 are closed. The slurry flow path will then be into first pipe 52, then into second pipe 84 in bypass relationship to valve 68, then through the next segment of first pipe 52, then into second pipe 86 in bypass relationship to valve 70, then back into first pipe 52 and continues in the latter until the flow reaches outlet 56.

For the maximum back pressure, such as 300 psi, valves 80 and 82 are opened and valves 68, 70, 72, 74, 76, 78, 104 and 106 are closed. Then the slurry flow is through all of the second pipes 84–94 where an incremental back pressure is developed at the upstream sides of each orifice choke 99, respectively.

A review of system 50 shows that only a single valve is needed for each second pipe, respectively, rather than the three as required in the prior art system 10. Since the second pipes of system 50 are in vertical planes, the solids in the slurry flow settle down when there is no flow through an orifice choke 99 so that the solids join the flow through pipe 52. Thus, each second pipe does not get plugged. Bypass pipe 100 is provided to allow repair work on orifice chokes 99 and the various valves, if necessary.

I claim:

1. A back pressure system for a slurry pipeline comprising: a first pipe having a fluid inlet and a fluid outlet; a back pressure device for each of a number of spaced locations, respectively, along said first pipe, each device including a generally inverted U-shaped second pipe having a pair of spaced, vertical sides and a pair of opposed open ends communicating with the first pipe, each second pipe having means for providing an orifice choke therein; and a valve for each second pipe, respectively, each valve being across said first pipe between the ends of the respective second pipe.

2. A system as set forth in claim 1, wherein each side of each second pipe has an orifice choke therewithin.

3. A back pressure system for a slurry pipeline comprising: a first pipe having a fluid inlet and a fluid outlet, the pipe defining a first path for a slurry flow between the inlet and the outlet; a plurality of inverted U-shaped second pipes, there being a second pipe for each of a plurality of spaced locations, respectively, along the length of the first pipe, each second pipe having a pair of opposed, generally parallel sides, the length of one side being greater than the length of the other side, said first pipe having a first segment and a second segment adjacent to each of said locations, respectively, each segment having a horizontal part and a vertical part, the longer side of each second pipe communicating with the horizontal part of the corresponding first segment and the shorter side of each second pipe communicating with the corresponding first and second segments at the junction of the vertical and horizontal parts thereof, respectively; a valve for each first segment, respectively, the valve being on the vertical part thereof; and an orifice choke for each of the sides of each second pipe, respectively, the chokes being operable to provide back pressure for a fluid flow therethrough.

4. A system as set forth in claim 3, wherein is provided a third pipe in bypass relationship to the first and second pipes, and valve means for controlling the flow of a slurry through the third pipe.

5. A system as set forth in claim 4, wherein said outlet is in the same horizontal plane as the inlet, said third pipe communicating with said inlet and being generally horizontally aligned with the inlet and the outlet.

6. A system as set forth in claim 3, wherein said orifices are spaced above the first pipe, the second pipes being generally coplanar with each other.

7. A back pressure system for a slurry pipeline comprising: a first pipe having a fluid inlet and a fluid outlet; a back pressure device for each of a number of spaced locations, respectively, along said first pipe, each device including a generally inverted U-shaped second pipe having a pair of spaced, vertical sides and a pair of opposed open ends communicating with the first pipe, each second pipe having one side longer than the other side, said first pipe having a first segment and a second segment for each location, respectively, each first segment extending between ends of the corresponding second pipe, each second segment extending from the end of the short side of a corresponding second pipe to the end of the long side of the next adjacent second pipe, each second pipe having means for providing an orifice choke therein; and a valve for each second pipe, respectively, each valve being across said first pipe between the ends of the respective second pipe.

8. A system as set forth in claim 7, wherein each first segment has a horizontal part and a vertical part, each valve being carried by the vertical part of the respective first segment.

9. A back pressure system for a slurry pipeline comprising: a first pipe having a fluid inlet and a fluid outlet; a back pressure device for each of a number of spaced locations, respectively, along said first pipe, each device including a generally inverted U-shaped second pipe having a pair of spaced, vertical sides and a pair of opposed open ends communicating with the first pipe, each second pipe having means for providing an orifice choke therein; a valve for each second pipe, respectively, each valve being across said first pipe between the ends of the respective second pipe; a third pipe coupled with said first pipe in bypass relationship thereto; and valve means for controlling the flow through the first and third pipes.

10. A system as set forth in claim 9, wherein the inlet and outlet of the first pipe are in the same generally horizontal plane, said third pipe being substantially in said horizontal plane and having a first upstream part extending horizontally from the first pipe near said inlet thereof.

* * * * *